United States Patent
Kokaram et al.

(10) Patent No.: US 10,277,919 B2
(45) Date of Patent: Apr. 30, 2019

(54) NOISE REDUCTION FOR IMAGE SEQUENCES

(71) Applicant: GOOGLE INC., Mountain View, CA (US)

(72) Inventors: Anil Kokaram, Sunnyvale, CA (US); Damien Kelly, Sunnyvale, CA (US); Andrew Joseph Crawford, Mountain View, CA (US); Hugh Pierre Denman, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 293 days.

(21) Appl. No.: 15/077,232

(22) Filed: Mar. 22, 2016

(65) Prior Publication Data

US 2016/0205415 A1    Jul. 14, 2016

Related U.S. Application Data (62) Division of application No. 13/443,826, filed on Apr. 10, 2012, now Pat. No. 9,326,008.

(51) Int. Cl.
*H04N 19/65* (2014.01)
*H04N 19/80* (2014.01)
(Continued)

(52) U.S. Cl.
CPC ............ *H04N 19/65* (2014.11); *G06T 5/002* (2013.01); *G06T 5/40* (2013.01); *H04N 5/145* (2013.01);
(Continued)

(58) Field of Classification Search
CPC .... H04N 19/65; H04N 19/117; H04N 19/142; H04N 19/179; H04N 19/80; H04N 19/85;
(Continued)

(56) References Cited

U.S. PATENT DOCUMENTS 5,500,685 A    3/1996    Kokstsm
5,550,935 A    8/1996    Erdem et al.
(Continued)

FOREIGN PATENT DOCUMENTS

EP    2413586 A1    2/2012
JP    06-245112 A    9/1994
(Continued)

OTHER PUBLICATIONS

Notice of Decision to Grant with English Translation from Korean Patent Application No. 10-2014-7031308, dated Sep. 30, 2016, 3 pages.
(Continued)

*Primary Examiner* — Nhon T Diep
(74) *Attorney, Agent, or Firm* — Brake Hughes Bellermann LLP (57) ABSTRACT

Described herein are techniques related to noise reduction for image sequences or videos. This Abstract is submitted with the understanding that it will not be used to interpret or limit the scope and meaning of the claims. A noise reduction tool includes a motion estimator configured to estimated motion in the video, a noise spectrum estimator configured to estimate noise in the video, a shot detector configured to trigger the noise estimation process, a noise spectrum validator configured to validate the estimated noise spectrum, and a noise reducer to reduce noise in the video using the estimated noise spectrum.

22 Claims, 5 Drawing Sheets (51) Int. Cl.
*H04N 19/85* (2014.01)
*G06T 5/40* (2006.01)
*H04N 5/14* (2006.01)
*H04N 19/117* (2014.01)
*H04N 19/142* (2014.01)
*H04N 19/179* (2014.01)
*H04N 19/86* (2014.01)
*G06T 5/00* (2006.01)

(52) U.S. Cl.
CPC ......... *H04N 19/117* (2014.11); *H04N 19/142* (2014.11); *H04N 19/179* (2014.11); *H04N 19/80* (2014.11); *H04N 19/85* (2014.11); *H04N 19/86* (2014.11); *G06T 2207/10016* (2013.01); *G06T 2207/20182* (2013.01)

(58) Field of Classification Search
CPC ........ H04N 19/87; H04N 5/145; G06T 5/002; G06T 5/40; G06T 2207/10016; G06T 2207/20182
See application file for complete search history.

(56) References Cited

U.S. PATENT DOCUMENTS

| | | | |
|---|---|---|---|
| 5,825,846 | A | 10/1998 | Aach et al. |
| 5,923,775 | A | 7/1999 | Snyder et al. |
| 5,974,192 | A | 10/1999 | Kundu |
| 6,285,710 | B1 | 9/2001 | Hurst, Jr. et al. |
| 6,307,888 | B1* | 10/2001 | Le Clerc ............ H04N 17/004 348/607 |
| 7,110,455 | B2 | 9/2006 | Wu et al. |
| 7,155,069 | B2* | 12/2006 | Ishizaka ................ G06T 3/403 382/298 |
| 7,369,181 | B2* | 5/2008 | Kang .................... H04N 5/144 348/606 |
| 7,911,501 | B2 | 3/2011 | Johnson et al. |
| 8,064,644 | B2 | 11/2011 | Kokaram |
| 8,160,149 | B2* | 4/2012 | Demos ................ H04N 19/597 375/240.16 |
| 8,237,868 | B2* | 8/2012 | Takeda .................... G06T 3/40 348/607 |
| 8,243,790 | B2 | 8/2012 | Leontaris |
| 8,350,966 | B2* | 1/2013 | Zhong .................... G06K 9/40 348/607 |
| 8,520,731 | B2 | 8/2013 | Schoenblum |
| 8,938,110 | B2 | 1/2015 | Goshen |
| 8,977,347 | B2* | 3/2015 | Mestha ................ A61B 5/7235 600/473 |
| 9,444,977 | B2* | 9/2016 | Moesle ................ H04N 17/004 |
| 2002/0034337 | A1 | 3/2002 | Shekter |
| 2003/0039310 | A1 | 2/2003 | Wu et al. |
| 2005/0128355 | A1 | 6/2005 | Kang et al. |
| 2005/0243205 | A1 | 11/2005 | Wredenhagen et al. |
| 2006/0050783 | A1 | 3/2006 | Le Dinh |
| 2009/0122866 | A1 | 5/2009 | Crawford et al. |
| 2012/0307116 | A1 | 12/2012 | Lansel |

FOREIGN PATENT DOCUMENTS

| | | |
|---|---|---|
| JP | 10-198788 A | 7/1998 |
| JP | 11-501140 A | 1/1999 |
| JP | 2004-329826 A | 11/2004 |
| JP | 2006-058185 A | 3/2006 |
| JP | 2006-226706 A | 8/2006 |
| JP | 2008-017448 A | 1/2008 |
| JP | 2008-060722 A | 3/2008 |
| JP | 2009-098435 A | 5/2009 |
| JP | 2010-148014 A | 7/2010 |
| JP | 2010-200176 A | 9/2010 |
| JP | 2011-128978 A | 6/2011 |
| KR | 10-2009-0012316 | 2/2009 |
| RU | 2189700 C2 | 9/2002 |
| RU | 2364937 C1 | 8/2009 |
| WO | WO 97/23844 | 7/1997 |
| WO | WO 2006/043258 A3 | 4/2006 |
| WO | WO 2006/072925 A3 | 7/2006 |
| WO | WO 2007118097 A1 | 10/2007 |

OTHER PUBLICATIONS

Japanese Office Action, dated Jan. 5, 2016, in related application No. JP2015-505854.
Kokaram, A. 3D Wiener Filterinf for Noise Suppression in Motion Picture Sequences using Overlapped Processing, Signal Processing VII: Theories and Applications, European Assoc. for Signal Process, Trumpington St. Cambridge, pp. 1780-1783 (1994).
Korean Office Action, dated Mar. 10, 2016; in related application No. KR10-2014-7031308.
Russian Office Action and Search Report, dated Jan. 27, 2016, in related application No. RU2014-141364/08(067041).

* cited by examiner

NOISE REDUCTION FOR IMAGE SEQUENCES

This application is a divisional of pending U.S. application Ser. No. 13/443,826, filed on Apr. 10, 2012, all of which is hereby expressly incorporated by reference into the present application.

BACKGROUND

Noise is a common problem in all media sources, including video. With the advent of digital cameras, noise is becoming more apparent and a worse problem for at least two reasons. One reason is that pictures are taken in environments that are not optimal for taking pictures. A second reason is that many digital pictures are compressed before they are transmitted, and noise in the image signal makes compression of the image a more complex undertaking.

SUMMARY

In general, one implementation of the subject matter disclosed herein may be a tool that reduces noise in an image sequence. The tool includes a motion estimator that is configured to yield a sequence of motion-compensated frames. The tool includes a noise spectrum estimator that is configured to estimate noise in one or more blocks of pixels in the sequence of input frames. The noise spectrum estimator identifies noisy and flat areas within the sequence of input frames. The noise spectrum estimator also calculates an estimated noise power spectrum for a current frame in the sequence of input frames from the noisy and flat areas within the sequence of input frames. The tool also includes a shot detector that is configured to detect a shot change within the sequence of input frames and to trigger the noise spectrum estimator in response to the detected shot change. The tool includes a noise reducer that is configured to reduce noise in the image sequence using the estimated noise power spectrum and the sequence of motion-compensated frames.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
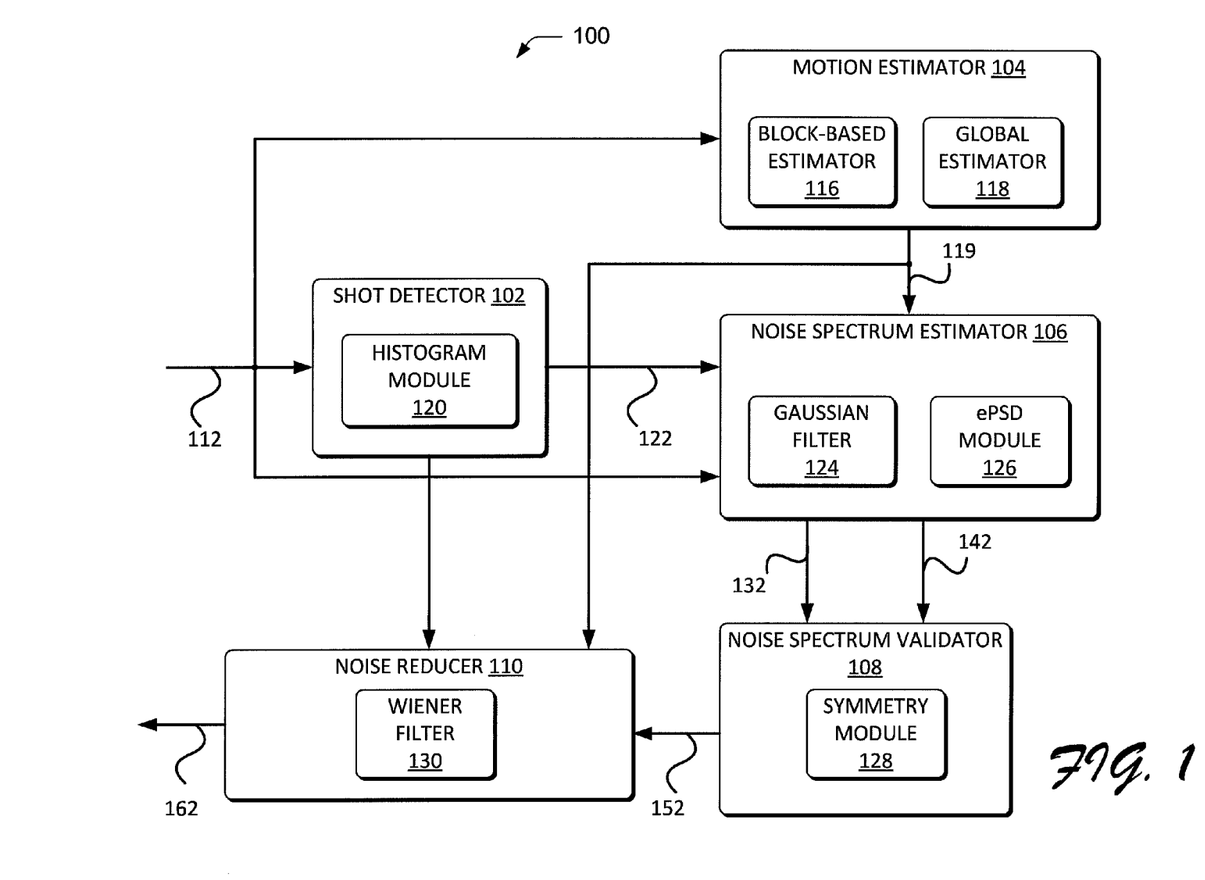
FIG. 1 illustrates an example noise reduction tool according to one or more implementations described herein.

This disclosure describes technology to reduce noise in a video, especially for uploaded content. FIG. 1 below illustrates a noise reduction tool in one or more implementations that includes a shot detector, a noise spectrum estimator, a noise spectrum validator, and a noise reducer. Three frames of the original image sequence (i.e., video) are input into the noise reduction tool. These three frames are the current frame of interest, the previous frame, and the next frame.

The motion estimator estimates the motion within the frames. One purpose of estimating the motion within frames in an image is to exploit the fact that scene content may not change much from frame to frame, and knowledge of where objects in the scene move helps to differentiate between objects and noise. Moving objects are not noise and should remain in the image. In instances in which motion estimation is performed, the motion estimator may use at least three original frames (e.g., the current frame of interest, the previous frame, and the next frame) to estimate the motion of the camera that was used to take the picture, looking for the dominant motion of the scene (Global Estimation), and/or to estimate the motion of each block in the image (Block-Based Estimation). The output of the motion estimator is three frames whose motion has been compensated so that there is no relative motion between the current frame and either the previous frame or the next frame.

The shot detector also receives at least three frames of the original image sequence. The shot detector determines where shot changes occur in the image. A shot exists from the time the camera begins filming to the time the camera stops filming. Typically, there are multiple shots in an image sequence because the camera stops and starts shooting several times. In some implementations, the shot detector determines shot changes by subtracting gray scale histograms of the current original frame and the previous original frame from each other. A large difference between the two histograms may indicate a shot change in the image sequence.

The noise spectrum estimator receives at least three frames of the original image sequence, the three motion-compensated frames from the motion estimator, and the output from the shot detector. The noise spectrum estimator may use the output from the shot detector to trigger the start of the noise spectrum estimation process. The noise spectrum estimator may use the original current frame, and the motion-compensated previous and next frames to determine which parts of the original frame are noise, which parts are texture, which parts are edges, etc. The noise spectrum estimator then uses a two-stage process to estimate the noise in the image. In the first stage, using a Gaussian blurring filter the noise spectrum estimator finds blocks in the original image that have only flat areas (no texture or edges) and noise. In the second stage, using a three dimensional fast Fourier transform (3-D FFT) blocks making it through the first stage are processed to estimate the noise power spectrum for those blocks. The output of the noise spectrum estimator is an estimated/calculated noise power spectral density (ePSD) and an associated number of blocks from which the ePSD was calculated.

The noise spectrum validator may receive the estimated noise power spectral density and may decide whether or not the ePSD represents believable noise statistics. That is, the power in each of the temporal Fourier planes should be approximately the same and the ePSD should be symmetrical. The validated estimated noise power spectral density may be output to the noise reducer.

The noise reducer may receive an original current frame, a motion-compensated previous frame, and a motion-compensated next frame. The noise reducer takes a block from the original current frame, a block from the motion-compensated previous frame, and a block from motion-compensated next frame and estimates a linear plane fit to the block from the original current frame. A two-dimensional plane is removed from the block of the original current frame, a block from the motion-compensated previous frame, and a block from motion-compensated next frame, and a frequency domain Wiener filter operation is performed on the block of the original current frame to reduce the noise in the block. The removed two-dimensional plane may then be returned to the block from the original current frame. This process yields a current frame whose noise has been reduced.

Example Noise Reduction Tool

FIG. 1 illustrates an example noise reduction tool 100 according to one or more implementations described herein. The illustrated tool 100 includes a shot detector 102, a motion estimator 104, a noise spectrum estimator 106, a noise spectrum validator 108, and a noise reducer 110. The illustrated noise reduction tool 100 obtains an original image sequence 112 and provides them to the shot detector 102, the motion estimator 104, and the noise spectrum estimator 106. The motion estimator 104 includes a block-based motion estimator 116 and a global estimator 118. The shot detector 102 includes a histogram module 120. The noise spectrum estimator 106 includes a Gaussian filter 124 and an ePSD module 126. The noise spectrum validator 108 includes a symmetry module 128. The noise reducer 110 includes a Wiener filter 130.

In one or more implementations, the noise reduction tool 100 may be a plug-in for an image processing editor. Alternatively, the noise reduction tool 100 may be implemented in an application specific integrated circuit (ASIC), a field programmable gate array (FPGA), a client machine, a server, a camera phone, a smartphone, a laptop phone, and/or the like.

The noise reduction tool 100 obtains three frames from the original image sequence 112. The three frames are an original current frame, an original previous frame, and an original next frame. Typically, when processing a movie or other image sequence that has been edited there are a number of shots. The different shots can have different noise properties. The shot detector 102 obtains the three frames and determines where a shot change occurs so that this can be taken into consideration during the noise reduction process.

In one or more implementations, the shot detector 102 uses the histogram module 120 to determine where shot changes occur in the original image sequence 112. For example, the histogram module 120 determines a difference in between a gray scale histogram of the original current frame and a gray scale histogram of the original previous frame. A large difference between the two histograms may indicate a shot change in original image sequence 112. A small difference between the two histograms may indicate there is no shot change in original image sequence 112.

In one or more implementations, the shot detector 102 determines a difference between intensity values of the original current frame and the original previous frame. A large difference between the two intensity values indicates a shot change in the original image sequence 112. A small difference between the two intensity values indicates that there is not a shot change in the original image sequence 112.

In one or more implementations, the shot detector 102 may calculate global motion between the original current frame and the original previous frame and may calculate the displaced frame difference (DFD) of the original current frame and the original previous frame. A large DFD may indicate a shot change in the image sequence 112. A small DFD may indicate that there is no shot change in the image sequence 112.

The motion estimator 104 also obtains the three frames from the original image sequence 112. In one or more implementations, the motion estimator 104 performs no motion estimation on the original image sequence 112, performs global motion estimation on the original image sequence 112, estimates a motion vector for every block in the original image sequence 112, where the block size varies with the image size, and/or estimates a motion vector for each pixel in the original image sequence 112.

For example, if the image size for the original image sequence 112 is less than 480p, the motion estimator 104 may not perform motion estimation on the original image sequence 112.

In implementations in which the motion estimator 104 may use the block-based estimator 116 to perform block-based motion estimation on the original image sequence 112, the block-based estimator 116 uses blocks of pixels to yield vectors corresponding to the motion of blocks in the current frame in the original image sequence 112. If the image resolution for the original image sequence 112 is greater than 480p, the block-based motion estimator 116 may perform the motion estimation process on blocks that are 32×32 pixels. If the image resolution for the original image sequence 112 is less than 480p but greater than 360p, the block-based motion estimator 116 may perform the motion estimation process on blocks that are 16×16 pixels. If the image resolution for the original image sequence 112 is less than 360p, the block-based motion estimator 116 may perform the motion estimation process on blocks that are 8×8 pixels.

For example, in one or more implementations, the block-based estimator 116 may use exhaustive search techniques to minimize the displacement (or velocity) between the blocks in the original current frame and the blocks in the original previous frame. The block-based estimator 116 may be implemented using very large scale integrated (VLSI) technology. The block-based estimator 116 may be implemented using any block-based motion estimating technique.

In one or more implementations, the motion estimator 104 may use the global estimator 116 to estimate the motion of the camera that was used to take the picture the original image sequence 112 was taken from, looking for the dominant motion of the scene. The global estimator 116 may then produce a single motion vector describing the global motion of the scene based on this estimate.

In one or more implementations, the motion estimator 104 may use known pel-recursive motion estimation techniques to obtain a set of vectors corresponding to motion of each pixel in the scene. The output of the motion estimator 104 is three frames whose motion has been compensated so that the relative motion between them is reduced or even eliminated, i.e., motion-compensated frames 119. That is, there is little or no relative motion between the motion-compensated current frame, the motion-compensated previous frame, and the motion-compensated next frame.

The noise spectrum estimator 106 may obtain the motion-compensated current frame, the motion-compensated previous frame, and the motion-compensated next frame from the motion estimator 104. The noise spectrum estimator 106 also may obtain the original current frame, the original previous frame, and the original next frame from the image sequence 112. The noise spectrum estimator 106 may use the shot detector output as a trigger 122 to start the noise spectrum estimation process.

In one or more implementations, the noise spectrum estimator 106 may use the original current frame, and the motion-compensated previous and next frames to determine which parts of the original frame are noise, which parts are texture, which parts are edges, etc. The noise spectrum estimator 106 may use a two-stage process to estimate the noise in the image sequence 112.

In the first stage, the noise spectrum estimator 106 may find blocks in the image sequence 112 that have only flat areas (no texture or edges) and noise. The block size may be set as follows. If the resolution of the image sequence 112 is greater than 480p, then the block size may be set at 32×32 pixels. If the resolution of the image sequence 112 is less than 480p but greater than 360p, then the block size may be set at 16×16 pixels. If the resolution of the image sequence 112 is less than 360p, then the block size may be set at 8×8 pixels.

The noise spectrum estimator 106 visits a grid of blocks in the image sequence 112. In one or more implementations, the blocks in the grid may overlap by a factor of two in both directions. For other implementations, the blocks in the grid may overlap by other factors, such as one, three, four, five, etc., in both directions.

The noise spectrum estimator 106 performs an intensity check on the image sequence 112. In one or more implementations, the noise spectrum estimator 106 may determine blocks in the grid whose brightness is between saturation and underexposure so these blocks can be excluded from the noise estimation process. For example, if the image sequence 112 is an 8-bit image, the average value of the brightness in a block may be within 0.05×255 and 0.95×255. In one or more implementations, the average value of the brightness in a block may be within 0.1×255 and 0.90×255. Alternatively still, in one or more implementations, the average value of the brightness in a block may be within 0.15×255 and 0.85×255.

The noise spectrum estimator 106 performs a motion-compensation check on the blocks that passed the intensity check. In one or more implementations, the noise spectrum estimator 106 may extract a block from the original current frame, a block from the motion-compensated previous frame that corresponds to the block extracted from the original current frame, and a block from the motion-compensated next frame that corresponds to the block extracted from the original current frame. The noise spectrum estimator 106 may determine a forward displaced frame difference (fDFD) and a backward displaced frame difference (bDFD) to yield a mean absolute error (MAE) between the block extracted from the original current frame.

The noise spectrum estimator 106 may then select blocks from the original current frame whose fDFD and bDFD are less than a large threshold. This is to ensure that these selected blocks are well-compensated for motion.

The units for the fDFD and bDFD may be grayscale levels. In one or more implementations in which the image is an 8-bit image, the grayscale levels range from 0 to 255. In these implementations, the threshold numbers are between 0 and 255. In some implementations, the large threshold may be 10.

The noise spectrum estimator 106 also performs a minimum-noise check on the blocks that passed the intensity check. In one or more implementations, the noise spectrum estimator 106 may select blocks from the original current frame whose fDFD and bDFD are greater than a small threshold. This is to ensure that these selected blocks have at least some noise. In one or more implementations, the small threshold may be 0.1.

The noise spectrum estimator 106 may perform a noise-only check on the blocks that have passed the intensity check, the motion-compensation check, and the minimum-noise check. In the noise-only check, the noise spectrum estimator 106 evaluates the textural content of the blocks that passed the intensity check, the motion-compensation check, and the minimum-noise check. In one or more implementations, the noise spectrum estimator 106 may calculate a minimum and maximum gradient of the blocks as well as the direction of the minimum and maximum gradient.

The calculations may be accomplished by Eigen analysis of any well-known 2×2 gradient correlation matrix (GTG). For example, the blocks may be considered to have only noise if the following are true: (1) the condition of the GTG matrix is less than a predetermined value (TC), (2) the determinant of the GTG matrix is less than a predetermined value (TDET), and (3) the square root of the trace of the GTG matrix is less than a predetermined value (TG). In one or more implementations, TC=50, TDET=0.04, and (3) the square root of the trace of the GTG matrix (TG) is less than 0.09.

The noise spectrum estimator 106 uses a low pass filtered version of the image sequence 112 to perform texture assessment. In one or more implementations, the Gaussian filter 124, which may, for example, have a variance of 0.5, may be used to low-pass filter the image sequence 112. The blocks that have passed the intensity check, the motion-compensation check, and the minimum-noise check, and the noise check may be considered to contain only noise, and may be passed on to the second stage of the noise spectrum estimator 106 processing.

In the second stage, the noise spectrum estimator 106 estimates the noise power spectrum for the blocks that are considered to contain only noise, as determined in the first stage of processing. In one or more implementations, the noise spectrum estimator 106 may ensure that there are a minimum number of blocks that contain only noise. The blocks are then processed to estimate the noise power spectrum. For example, if there at least five blocks that have been determined to contain only noise, the noise spectrum estimator 106 may estimate the noise power spectrum using these blocks.

Figure 2:
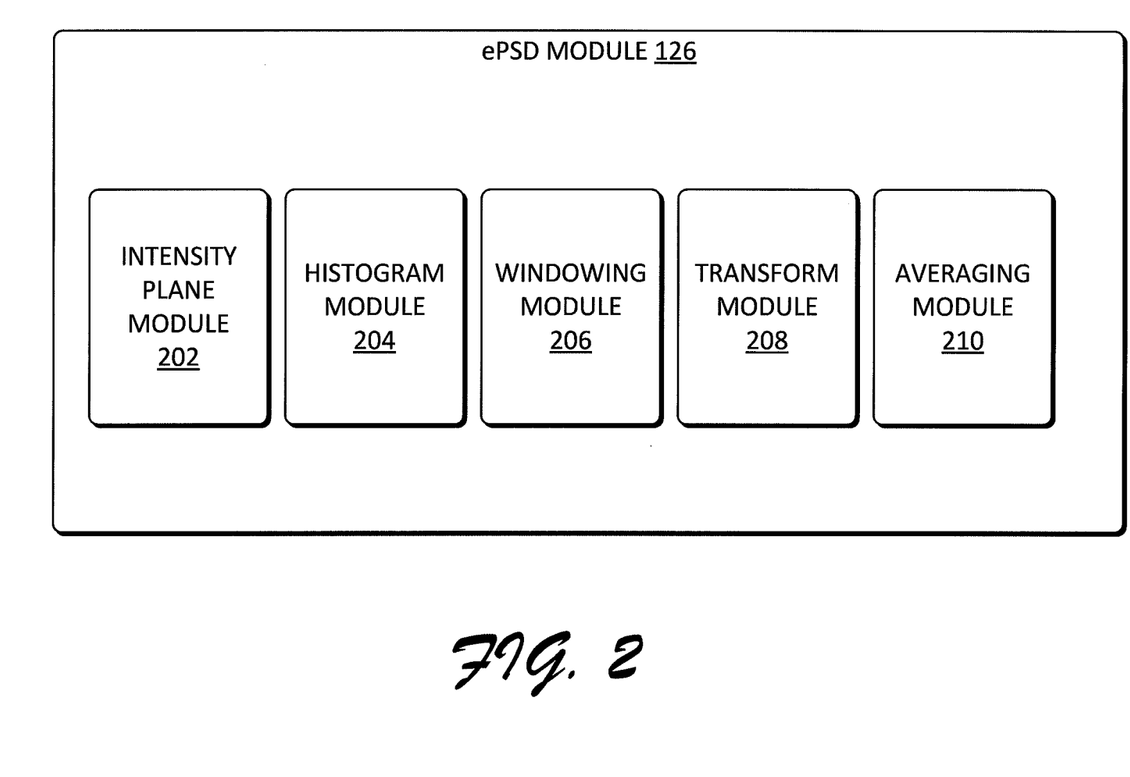
FIG. 2 illustrates an example estimated power spectrum density (ePSD) module depicted in FIG. 1 according to one or more implementations described herein.

In one or more implementations, the ePSD module 126 implements portions of the second stage of the noise spectrum estimator 106. FIG. 2 illustrates the ePSD module 126 in more detail. The illustrated ePSD module 126 includes an intensity plane module 202, a histogram module 204, a windowing module 206, a transform module 208, and an averaging module 210.

The noise spectrum estimator 106 selects a block of interest from the blocks that have been determined to contain only noise and the intensity plane module 202 fits an intensity plane to the block of interest. That is, the intensity plane module 202 may estimate a linear plane fit to the block of interest. The intensity plane has the form of $$I' = a + bh + ck + dhk$$

where a, b, c, and d are the coefficients of the intensity plane, and h, k are the row, column coordinates of the pixel.

The intensity plane module 202 estimates a linear plane fit to the block of interest and removes a two-dimensional plane from the block of interest. The intensity plane module 202 finds a difference between the intensity of the block of interest and the intensity of the pixel in the noisy original current frame to yield an error, $e_c$.

$$e_c = I_c - I'$$

where $I_c$ is the intensity of the pixel. This process of finding a difference between the intensity of a block of interest and the intensity of a pixel in a corresponding noisy original current frame is used to yield an error, $e_c$. The variance of the error signal, $e_c$, is approximately related to the variance of the noise in the noisy image sequence 112.

In one or more implementations, the noise spectrum estimator 106 may determine a consensus among blocks as to which subset of blocks agrees on the value of the variance of the error signal, ec. The histogram module 204 may create a histogram of the noise variances. The noise spectrum estimator 106 selects blocks in the mode of the histogram to represent the noise blocks appropriate for calculation of the noise spectrum. For example, if there are fewer than five blocks in the mode, the noise spectrum estimator 106 may include the histogram bins to either side of the mode. If there are still fewer than five blocks, this noisy original current frame may not be processed for noise estimation, and another noisy original current frame may be selected for processing.

For the final set of selected blocks, the intensity plane module 202 may determine a difference between the estimated plane of the previous and next blocks to yield two more error blocks eP and eN corresponding to the blocks from the previous and next frames.

The windowing module 206 windows the error blocks ec, eP, and eN. In one or more implementations, the windowing module 206 may include a two-dimensional Hamming window. In other implementations, the windowing module 206 may use other suitable windows, such as a triangle windows and rectangle windows, for example.

The transform module 208 calculates an estimate of the power spectrum for the signals in the error blocks ec, eP, and eN. This power is termed "power spectral density" (PSD). As used herein, "power," refers to the squared amplitude of the spectral components in the transform of the signals in the error blocks ec, eP, and eN.

Assuming that the intensity plane fit has modeled the underlying image sequence 112 information, the error signals are representations of the noise in the image sequence 112, and the power spectrum of the noise has been calculated and each error block ec, eP, and eN yields an example of that power spectrum. In one or more implementations, the transform module 208 may calculate an estimate of the power spectrum for the signals in the error blocks ec, eP, and eN using a three-dimensional fast Fourier transform, a discrete cosine transform, or other suitable transform.

In one or more implementations, the averaging module 210 averages the power spectrum of each error block ec, eP, and eN to yield the final estimate of the noise power spectrum. One output 132 of the noise spectrum estimator 106 is a noise power spectrum. Another output 142 is an associated number of blocks from which the estimated noise power spectrum was calculated. Alternatively, if the noise spectrum estimator 106 did not calculate any noise power spectra, the noise spectrum estimator 106 may wait for another frame to process to estimate the noise power spectrum.

In one or more implementations, the noise spectrum estimator 106 may pre-calculate an estimated noise power spectrum. This is accomplished by having a user take a picture of a flat image, such as a wall with no texture, or a gray piece of card, for example. The user provides the flat image statistics to the ePSD module 126, which outputs the pre-calculated estimated noise power spectrum.

The noise spectrum estimation performed by the noise spectrum estimator 106 can still be erroneous if there is a lot of texture in the image sequence 112, and that texture looks like noise. The noise spectrum estimation performed by the noise spectrum estimator 106 also can be erroneous when there is difficult motion to track. Referring back to FIG. 1, the noise spectrum validator 108 obtains the estimated noise power spectral density and determines whether the power spectrum represents believable noise statistics.

In implementations in which a three-dimensional fast Fourier transform calculates an estimate of the power spectrum for the signals in the error blocks ec, eP, and eN, to be valid, the noise power spectrum should be roughly the same for each of the three temporal Fourier planes. If the ratio of the mean energy in each of the three temporal Fourier planes is greater than a threshold value, then the temporal Fourier plane with the minimum energy may be copied into the planes that have the most power to keep the power mismatch to a minimum. In one or more implementations, the threshold value is 3.0, which ensures that the energy mismatch in the planes is less than three. The threshold value of 3.0 also provides some tolerance, up to a level of ×3 to account for unusual power spectra.

Additionally, to be valid an estimated power spectrum should be symmetrical. In one or more implementations, the symmetry module 128 may detect the symmetry in the estimated noise power spectra for the blocks. For example, in implementations in which a three-dimensional fast Fourier transform calculates an estimate of the power spectrum for the signals in the error blocks ec, eP, and eN, the symmetry module 128 may use a ratio between the energy along the horizontal and vertical axes of each temporal Fourier plane. If the estimated noise power spectrum is asymmetrical, the symmetry module 128 determines that the noise power spectrum is invalid. In place of the invalid noise power spectrum, the symmetry module 128 provides a flat noise power spectrum. That is, the symmetry module 128 provides a noise power spectrum that has the same energy in each fast Fourier transform bin.

The noise spectrum validator 108 may also scale the estimated noise power spectrum to account for any potential lack of visible effect in the noise reduction process of using the estimated noise power spectrum. The noise spectrum validator 108 may scale luminance channels by a factor of 3.5 and color channels by a factor of 7.0. However, in one or more implementations the noise spectrum validator 108 may scale the estimated noise power spectrum by any factor greater than one.

The noise spectrum validator 108 also may enhance edges in the image sequence 112. This is accomplished by boosting high frequency content relative to low frequency content in the image sequence 112. In one or more implementations in which a three-dimensional fast Fourier transform calculates an estimate of the power spectrum for the signals in the error blocks ec, eP, and eN, the edges of the image sequence 112 are enhanced by multiplying the high frequency coefficients by a function that increases away from one.

The output 152 of the noise spectrum validator 108 is either a validated estimated noise power spectrum or an indication that the estimated noise power spectrum is invalid.

The noise reducer 110 may perform noise reduction on the image sequence 112 using the estimated noise power spectrum. In one or more implementations, the noise reducer 110 obtains an original current frame from the image sequence 112, a motion-compensated previous frame from the motion estimator 104, and a motion-compensated next frame from the motion estimator 104. The noise reducer 110 takes a block from the original current frame, a block from the motion-compensated previous frame, and a block from motion-compensated next frame and estimates a linear plane fit to the block from the original current frame. A two-dimensional plane is removed from the block of the original current frame, and the Wiener filter 130 performs a frequency domain Wiener filter operation on the block of the original current frame to reduce the noise in the block using the estimated noise power spectrum calculated by the noise spectrum estimator 106. The removed two-dimensional plane is then returned to the block from the original current frame. The output 162 of the noise reducer 110 is a noise reduced version of the original current frame in the image sequence 112.

In performing noise reduction, for each block processed the noise reducer 110 makes the following determinations. If the forward displaced frame difference (fDFD) and the backward displaced frame difference (bDFD) between the original current frame, the motion-compensated previous frame, and the motion-compensated next frame are higher than a threshold, then the noise reducer 110 may determine that motion compensation has not been successful. The noise reducer 110 may repeat the current block in the direction of the mismatched block. In one or more implementations, the threshold value may be ten for luminance channels and five for chrominance channels.

If the fDFD and the bDFD between the original current frame, the motion-compensated previous frame, and the motion-compensated next frame are too low, then the noise reducer 110 does not perform noise reduction on the original current frame. In one or more implementations, if the fDFD and the bDFD between the original current frame, the motion-compensated previous frame, and the motion-compensated next frame are less than 0.1 grayscale levels, then the noise reducer 110 does not perform noise reduction on the original current frame.

If the spatial variance of the signal in the current block is too low, then the noise reducer 110 does not perform noise reduction on the original current frame. In one or more implementation, if the spatial variance of the signal in the current block is zero, then the noise reducer 110 does not perform noise reduction on the original current frame.

If the energy of the estimated noise power spectrum is too low, then the noise reducer 110 determines that there is no noise in the original current frame. As such, the noise reducer 110 does not perform noise reduction on the original current frame. In one or more implementations, the noise reducer 110 does not perform noise reduction on the original current frame if the energy of the estimated noise power spectrum is less than 40 dB. In one or more other implementations, the noise reducer 110 does not perform noise reduction on the original current frame if the energy of the estimated noise power spectrum is less than 30 dB.

Example Method for Reducing Noise

Figure 3:
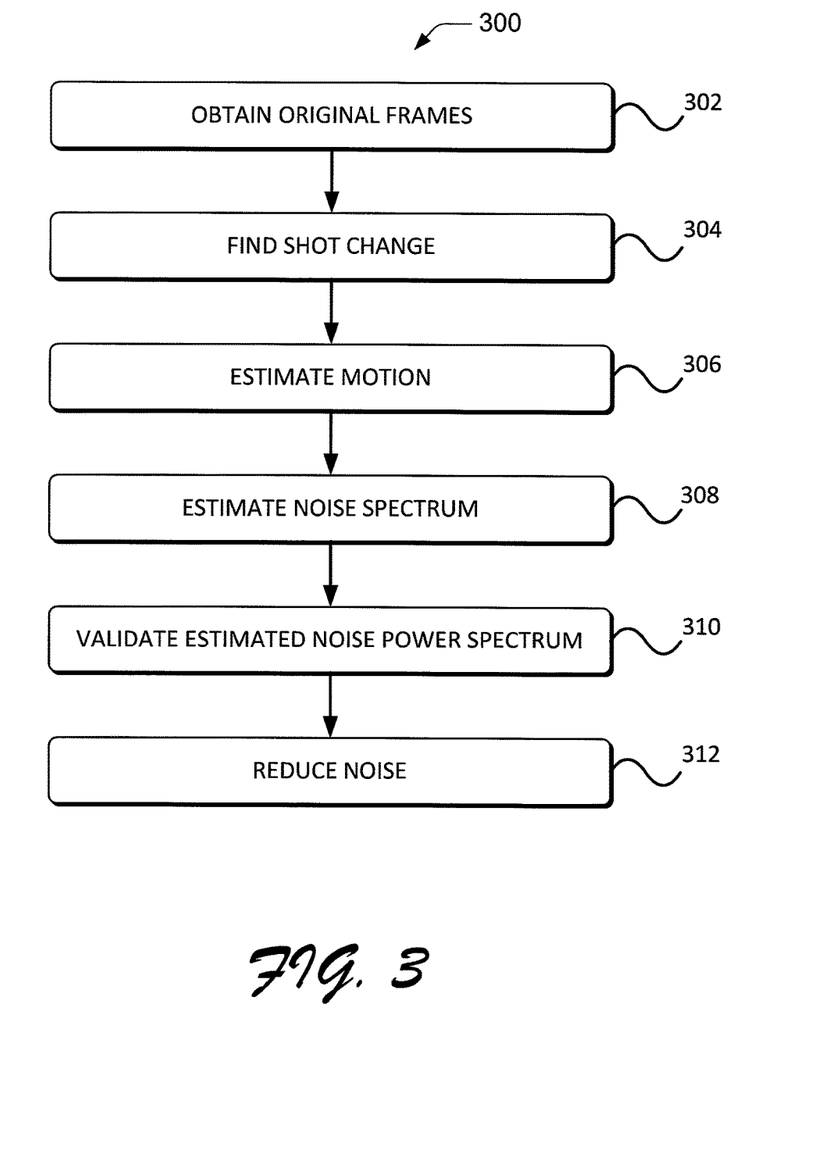
FIG. 3 is a flowchart of a method for reducing noise in an image sequence according to one or more implementations described herein.

FIG. 3 is a flowchart of a method 300 implemented by a noise reduction tool, such as the noise reduction tool 100 illustrated in FIG. 1, according to the technology described herein. For example, the noise reduction tool obtains the image sequence The shot detector 102 finds a shot change in the image sequence 112. The motion estimator 104 estimates the motion of blocks in the image sequence 112. The noise spectrum estimator 106 estimates the noise in the image sequence 112 to yield an estimated noise power spectrum. The noise spectrum validator 108 validates the estimated noise power spectrum. The noise reducer reduces noise in the image sequence 112 using the validated estimated noise power spectrum.

In a block 302, the noise reduction tool 100 obtains original frames from the image sequence 112. In one or more implementations, the shot detector 102, the noise estimator 104, and the noise spectrum estimator 106 obtain original frames from the image sequence 112. The original frames include an original current frame, an original previous frame, and an original next frame.

The noise reduction tool 100 uses any suitable mechanism to obtain the original frames from the image sequence 112. For example, in one or more implementations the noise reduction tool 100 obtains the image sequence 112 from a camera, a Motion Pictures Experts Group-2 (MPEG-2) compressed video file, an h264 video file, or the like.

In a block 304, the noise reduction tool 100 finds a shot change in the image sequence 112. In one or more implementations, the shot detector 102 detects a shot change in the image sequence 112 by finding a difference between a gray-scale histogram of the original current frame and a gray-scale histogram of the original previous frame. A large difference between the two histograms indicates a shot change while a small difference between the two histograms indicates there is no shot change.

In a block 306, the noise reduction tool 100 estimates the motion in the image sequence 112. In one or more implementations, the motion estimator 104 uses global motion estimation techniques and/or block-based motion estimation techniques to estimate the motion of the original previous frame and the original next frame with respect to the original current frame.

In a block 308, the noise reduction tool 100 estimates the noise power spectrum of the image sequence 112. In one or more implementations, the noise spectrum estimator 106 estimates the noise power spectrum in the image sequence by finding blocks in the image sequence 112 that contain only flat areas and by calculating the estimate of the power spectrum for the flat blocks.

In a block 310, the noise reduction tool 100 validates the estimated noise power spectra for each block. In one or more embodiments, the noise spectrum validator 108 checks for symmetry of the estimated noise power spectra. In one or more embodiments, the noise spectrum validator 108 also scales the estimated noise power spectra by a factor greater than one.

In a block 312, the noise reduction tool 100 reduces noise in the image sequence 112. In one or more implementations, the noise reducer 110 estimates a linear plane fit to the block from the original current frame, removes a two-dimensional plane from the block, and applies the Wiener filter 130 to the block to reduce the noise in the original current frame. The noise reducer 110 then replaces the two-dimensional plane to the block from the original current frame.

Example Method for Estimating Noise

Figure 4:
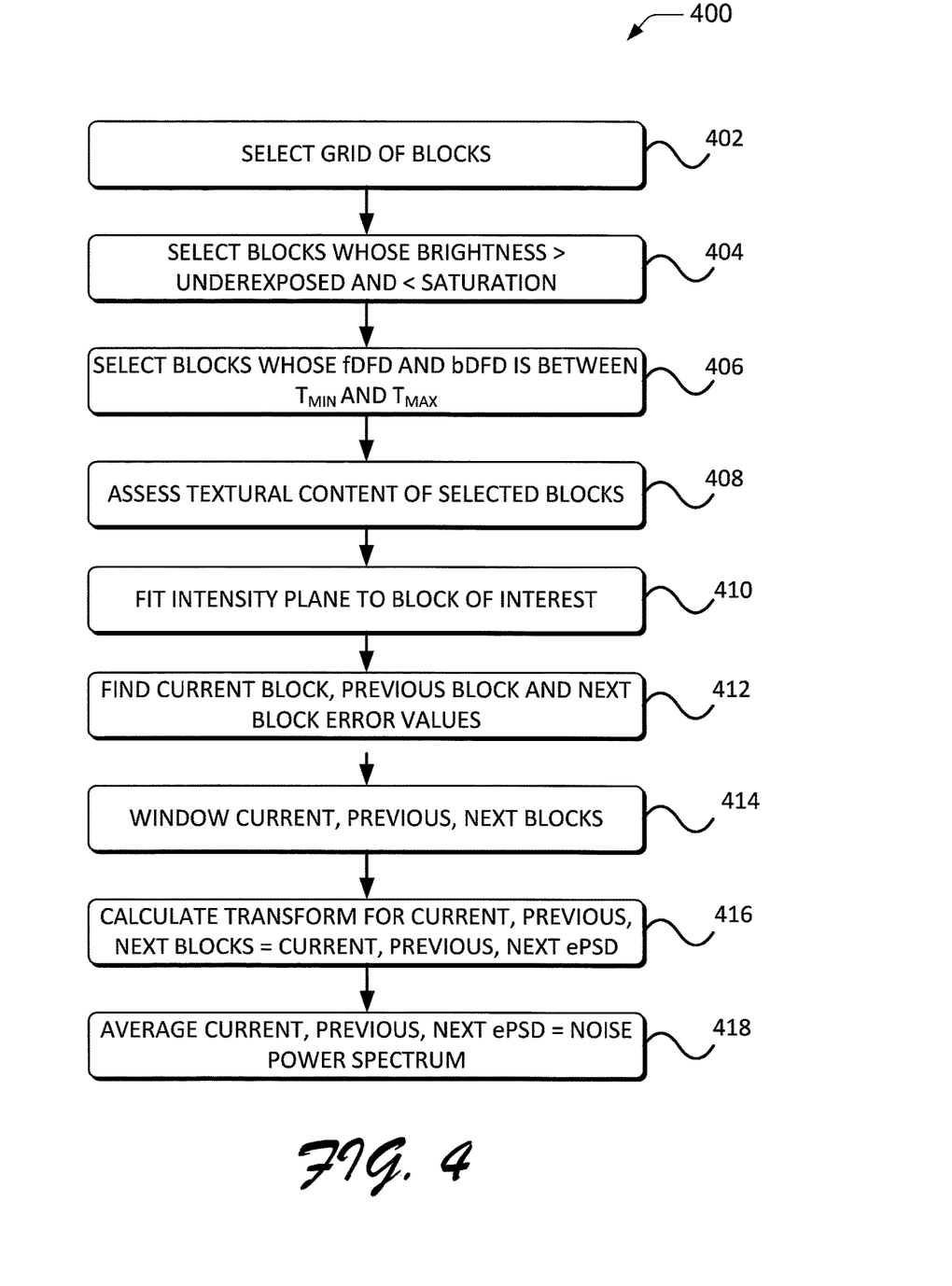
FIG. 4 is a flowchart of a method for estimating noise in an image sequence according to one or more implementations described herein.

FIG. 4 is a flowchart of a method 400 implemented by a noise spectrum estimator, such as the noise spectrum estimator 106 illustrated in FIG. 1, according to the technology described herein. In one or more implementations, the noise spectrum estimator 106 obtains original frames from the image sequence 112, motion-compensated frames 119 from the motion estimator 104, and the trigger 122 from the shot detector 102. The original frames in the image sequence 112 include an original current frame, an original previous frame, and an original next frame.

In a block 402, the noise spectrum estimator 106 selects a grid of blocks from the image sequence 112. In one or more implementations, if the resolution of the image sequence 112 is greater than 480p, then the noise estimator 106 sets a block size is set at 32×32 pixels. If the resolution of the image sequence 112 is less than 480p but greater than 360p, then the noise estimator 106 sets the block size at 16×16 pixels. If the resolution of the image sequence 112 is less than 360p, then the noise estimator 106 sets the block size at 8×8 pixels. In one or more implementations, the noise spectrum estimator 106 selects a grid of blocks such that the overlap is by a factor of two in both the horizontal and vertical directions.

In a block 404, the noise spectrum estimator 106 selects blocks whose brightness is greater than underexposed and less than saturated so these blocks can be excluded from the noise estimation process. For example, if the image sequence 112 is an 8-bit image, the average value of the brightness in a block is within 0.05×255 and 0.95×255. In one or more implementations, the average value of the brightness in a block is within 0.7×255 and 0.81×255. Alternatively still, in one or more implementations, the average value of the brightness in a block is within 0.13×255 and 0.76×255.

In a block 406, the noise spectrum estimator 106 selects blocks whose fDFD and bDFD is between a minimum threshold and a maximum threshold. In one or more implementations, the large threshold is 10 and the small threshold is 0.1.

In a block 408, the noise spectrum estimator 106 assesses the textural content of selected blocks. In one or more implementations, the Gaussian filter 124 filters the blocks selected for the texture assessment. The noise spectrum estimator 106 calculates a minimum and maximum gradient of the filtered blocks as well as the direction of the minimum and maximum gradient of the selected blocks to assess their textural content.

In a block 410, the noise spectrum estimator 106 selects a block of interest and fits an intensity plane to the block of interest. In one or more implementations, the intensity plane module 202 estimates a linear plane fit to the block of interest.

In a block 412, the noise spectrum estimator 106 finds error values for the original current block, the original previous block, and the original next block. In one or more implementations the intensity plane module 202 finds a difference between the intensity plane that was fit to the block of interest and the intensity of the pixel in the noisy original current frame to yield the error ec. The intensity plane module 202 also finds a difference between the estimated plane of the previous and next blocks to yield two more error blocks eP and eN corresponding to the blocks from the previous and next frames.

In a block 414, the noise spectrum estimator 106 widows the current, the previous, and the next blocks. In one or more implementations, the windowing module 206 windows the error blocks ec, eP, and eN using a two-dimensional Hamming window.

In a block 416, the noise spectrum estimator 106 calculates a three-dimensional fast Fourier transform of the block of interest, the previous block, and the next block. In one or more implementations, the transform module 208 calculates an estimate of the power spectrum for the signals in the error blocks ec, eP, and eN to yield an estimated noise power spectrum for the current, previous, and next blocks, respectively.

In a block 418, the noise spectrum estimator 106 averages the estimated noise power spectra for the signals in the error blocks ec, eP, and eN. In one or more implementations, the averaging module 210 averages the power spectrum of each error block ec, eP, and eN to yield the final estimate of the noise power spectrum.

The methods 300 and 400 are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

Example Computing Environment

Figure 5:
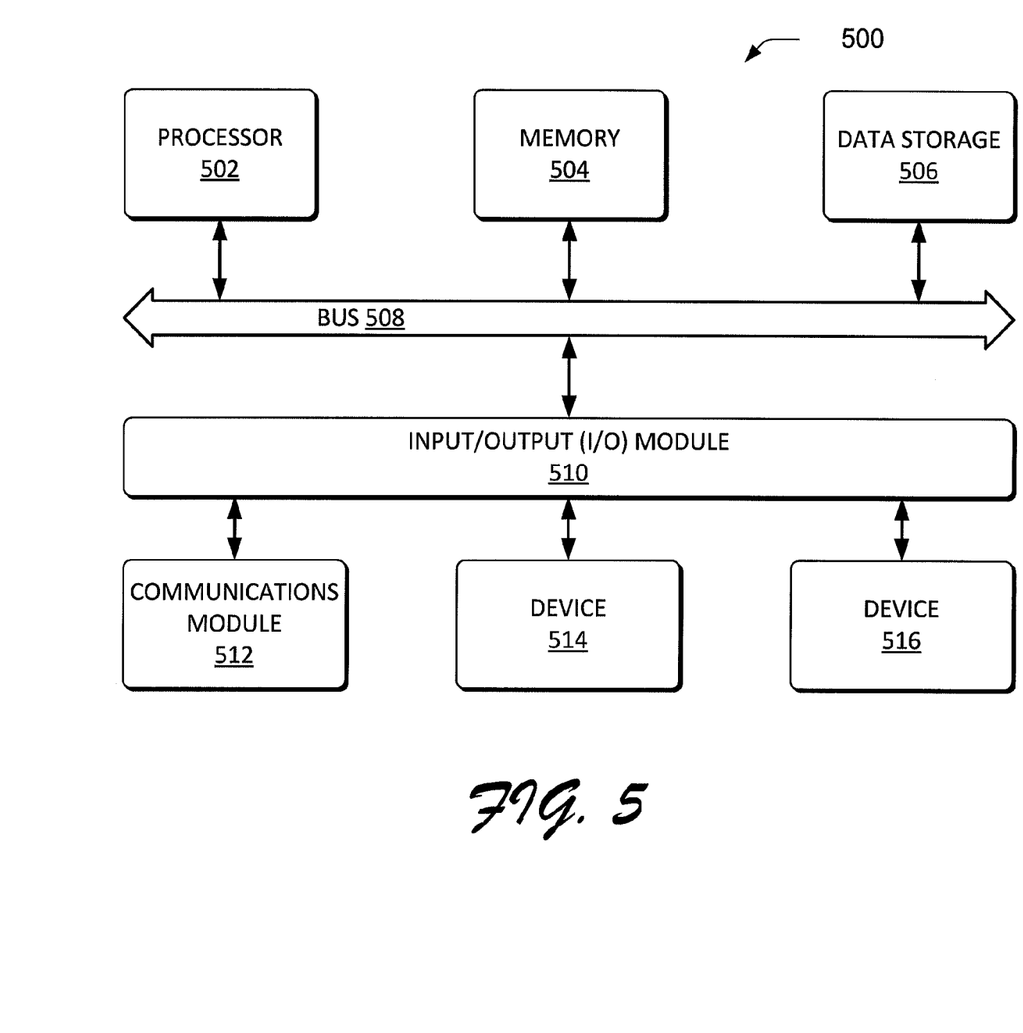
FIG. 5 is a high-level block diagram illustrating an example computer system suitable for implementing the technology described herein.

FIG. 5 is a high-level block diagram illustrating an example computer system 500 suitable for implementing the noise reduction tool 100 of FIG. 1. In certain aspects, the computer system 500 may be implemented using hardware or a combination of software and hardware.

The illustrated computer system 500 includes a processor 502, a memory 504, and data storage 506 coupled to a bus 508 or other communication mechanism for communicating information. An input/output (I/O) module 510 is also coupled to the bus 508. A communications module 512, a device 514, and a device 516 are coupled to the I/O module 510.

The processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 502 may be used for processing information. The processor 502 can be supplemented by, or incorporated in, special purpose logic circuitry.

The memory 504 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 502. They memory 504 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 500, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

The data storage 506 may be a magnetic disk or optical disk, for example. The data storage 506 may function to store information and instructions to be used by the processor 502 and other components in the computer system 500.

The bus 508 may be any suitable mechanism that allows information to be exchanged between components coupled to the bus 508. For example, the bus 508 may be transmission media such as coaxial cables, copper wire, and fiber optics, optical signals, and the like.

The I/O module 510 can be any input/output module. Example input/output modules 510 include data ports such as Universal Serial Bus (USB) ports.

The communications module 512 may include networking interface cards, such as Ethernet cards and modems.

The device 514 may be an input device. Example devices 514 include a keyboard, a pointing device, a mouse, or a trackball, by which a user can provide input to the computer system 500.

The device 516 may be an output device. Example devices 516 include displays such as cathode ray tubes (CRT) or liquid crystal display (LCD) monitors that display information, such as web pages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

In the claims appended herein, the inventor invokes 35 U.S.C. § 112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. § 112, paragraph 6.

What is claimed is:

1. A method implemented by one or more computing devices configured to reduce noise in an image sequence, the method comprising:
    estimating motion between an original current frame in the image sequence and an original previous frame in the image sequence, and between the original current frame in the image sequence and an original next frame in the image sequence, the estimation to yield a motion-compensated current frame, a motion-compensated previous frame, and a motion-compensated next frame;
    detecting a shot change in the image sequence;
    using the motion-compensated current, previous, and next frames, and using the detected shot change as a trigger, estimating noise in a block of pixels in the original current frame to yield an estimated noise power spectrum for the original current frame;
    validating the estimated noise power spectrum, yielding a validated estimated noise power spectrum; and
    reducing noise in the image sequence using the validated estimated noise power spectrum.

2. The method according to claim 1, wherein estimating noise in the block of pixels includes selecting a grid of blocks in the original current frame whose brightness is between saturation and underexposed.

3. The method according to claim 1, wherein estimating noise in the block of pixels includes selecting a grid of blocks in the original current frame whose brightness is between 5% and 95% of an intensity of a maximum brightness for the image sequence.

4. The method according to claim 1, wherein estimating noise in the block of pixels includes selecting blocks whose displaced frame difference between themselves and a block in the motion-compensated previous frame is between two threshold values.

5. The method according to claim 1, wherein estimating noise in the block of pixels includes selecting blocks whose displaced frame difference between themselves and a block in the motion-compensated next frame is between the two threshold values.

6. The method according to claim 1, wherein estimating noise in the block of pixels includes assessing the textural content of a selected grid of blocks.

7. The method according to claim 1, wherein validating the estimated noise power spectrum includes determining whether the estimated noise power spectrum is asymmetric.

8. The method according to claim 1, wherein reducing noise in the image sequence using the validated estimated noise power spectrum includes, using a block of pixels from the motion-compensated previous frame and a block of pixels from the motion-compensated previous frame, estimating a linear plane fit block of pixels from the original current frame to the block of pixels from the original current frame.

9. The method according to claim 1, wherein reducing noise in the image sequence using the validated estimated noise power spectrum includes removing a two-dimensional plane from the block of pixels from the original current frame.

10. The method according to claim 1, wherein reducing noise in the image sequence includes using the validated estimated noise power spectrum includes applying a Wiener filter to the block of pixels from the original current frame.

11. The method according to claim 1, wherein reducing noise in the image sequence includes using the validated estimated noise power spectrum includes returning the two-dimensional plane to the block of pixels from the original current frame.

12. One or more non-transitory computer-readable media storing processor-executable instructions that when executed cause one or more processors to perform a method to estimate a noise power spectrum in an image sequence, the method comprising:
    obtaining an original current frame, an original previous frame, and an original next frame from an image sequence;
    obtaining a motion-compensated current frame, a motion-compensated previous frame, and a motion-compensated next frame; and
    using the original current frame, original previous frame, original next frame, motion-compensated current frame, motion-compensated previous frame, and the motion-compensated next frame, estimating noise in the original current frame, wherein estimating the noise in the original current frame includes selecting blocks whose displaced frame difference between themselves and a block in the motion-compensated previous frame is between two threshold values.

13. The one or more non-transitory computer-readable media according to claim 12, wherein estimating the noise in the original current frame includes applying a Gaussian blurring filter to the original current frame, original previous frame, and original next frame.

14. The one or more non-transitory computer-readable media according to claim 12, wherein estimating the noise in the original current frame includes applying a three-dimensional fast Fourier transform to the original current frame, original previous frame, and original next frame.

15. The one or more non-transitory computer-readable media according to claim 12, wherein estimating the noise in the original current frame includes selecting a grid of blocks in the original current frame whose brightness is between saturation and underexposed.

16. The one or more non-transitory computer-readable media according to claim 12, wherein estimating the noise in the original current frame includes selecting a grid of blocks in the original current frame whose brightness is between 5% and 95% of an intensity of a maximum brightness for the image sequence.

17. The one or more non-transitory computer-readable media according to claim 12, wherein estimating the noise in the original current frame includes selecting a grid of blocks in the original current frame whose brightness is between 10% and 90% of an intensity of a maximum brightness for the image sequence.

18. The one or more non-transitory computer-readable media according to claim 12, wherein estimating the noise in the original current frame includes selecting blocks whose displaced frame difference between themselves and a block in the motion-compensated next frame is between two threshold values.

19. The one or more non-transitory computer-readable media according to claim 12, wherein estimating the noise in the original current frame includes assessing the textural content of a grid of blocks in the image sequence.

20. The one or more non-transitory computer-readable media according to claim 12, wherein estimating the noise in the original current frame includes:
    fitting an intensity plane to a block of interest in the original current frame;
    determining a difference between the intensity plane and the block of interest to yield a current-frame error value;
    determining a difference between the intensity plane and a grid of blocks in the original previous frame and a grid of blocks in the original next frame to yield a previous-frame error value; and
    determining a difference between the intensity plane and the grid of blocks in the original previous frame and a grid of blocks in the original next frame to yield a next-frame error value.

21. The one or more non-transitory computer-readable media according to claim 12, wherein estimating the noise in the original current frame includes applying a two-dimensional hamming window to the grid of blocks in the original current frame, the grid of blocks in the original previous frame, and the grid of blocks in the original next frame.

22. The one or more non-transitory computer-readable media according to claim 12, wherein estimating the noise in the original current frame includes:
    calculating a three-dimensional fast Fourier transform of the grid of blocks in the original current frame to yield a power spectrum estimate of the current-frame error value;
    calculating a three-dimensional fast Fourier transform of the grid of blocks in the original previous frame to yield a power spectrum estimate of the previous-frame error value;
    calculating a three-dimensional fast Fourier transform of the grid of blocks in the original next frame to yield a power spectrum estimate of the next-frame error value; and
    averaging the power spectrum estimates to yield a noise power spectrum.

* * * * *